United States Patent [19]

Wada et al.

[11] Patent Number: 5,546,150
[45] Date of Patent: Aug. 13, 1996

[54] APPARATUS PROVIDED WITH A MOVABLE CARTRIDGE CASING

[75] Inventors: Shigeru Wada, Kishiwada; Ikushi Nakamura, Sakai; Takuya Ueno, Hashimoto; Ken Tanino, Kobe; Yoshito Konishi, Sakai; Nobuharu Murashima, Nara, all of Japan

[73] Assignee: Minolta Co., Ltd., Osaka, Japan

[21] Appl. No.: 304,842

[22] Filed: Sep. 13, 1994

[30]     Foreign Application Priority Data

Sep. 14, 1993  [JP]  Japan .................................. 5-250990
Oct. 19, 1993  [JP]  Japan .................................. 5-283885

[51] Int. Cl.⁶ ........................... G03B 17/02; G03B 17/26; G03B 1/04
[52] U.S. Cl. ...................... 354/288; 354/275; 242/338.4
[58] Field of Search ............................ 354/212, 275, 354/288, 174, 173.1; 352/72, 74, 78 R; 242/332.1, 338.4, 348.3, 558

[56]           References Cited

U.S. PATENT DOCUMENTS

| 4,363,547 | 12/1982 | Hashimoto et al. | 354/212 |
| 4,647,170 | 3/1987  | Stoneham         | 354/275 |
| 4,752,797 | 6/1988  | Sekine et al.    | 354/212 |
| 4,841,319 | 6/1989  | Hansen           | 354/275 |
| 5,105,211 | 4/1992  | Kameyama         | 354/173.1 |
| 5,142,316 | 8/1992  | Tanii et al.     | 354/212 |
| 5,307,099 | 4/1994  | Kawamura et al.  | 354/275 |
| 5,422,695 | 6/1995  | Katagiri         | 354/173.1 |

FOREIGN PATENT DOCUMENTS 4-80734  7/1990  Japan .
4-80735  7/1990  Japan .

*Primary Examiner*—A. A. Mathews
*Attorney, Agent, or Firm*—Burns, Doane, Swecker & Mathis, L.L.P.

[57]            ABSTRACT

An apparatus is provided with a movable cartridge casing capable of facilitating film cartridge loading and unloading operations. In a loading operation, the cartridge casing is positioned at a cartridge receiving position outside the body of the apparatus so that the film cartridge can easily be inserted in the cartridge casing, the cartridge casing containing the film cartridge is pushed into the body to an intermediate position where the film spool of the film cartridge is separated from a spool driving shaft, and then the cartridge casing is moved toward the spool driving shaft along a line substantially parallel to the axis of the spool driving shaft to bring the film spool into engagement with the spool driving shaft. In an unloading operation, the cartridge casing is moved away from the spool driving shaft to the intermediate position along the line substantially parallel to the axis of the spool driving shaft to separate the film spool from the spool driving shaft, and then the cartridge casing is moved to the cartridge receiving position outside the body.

13 Claims, 17 Drawing Sheets

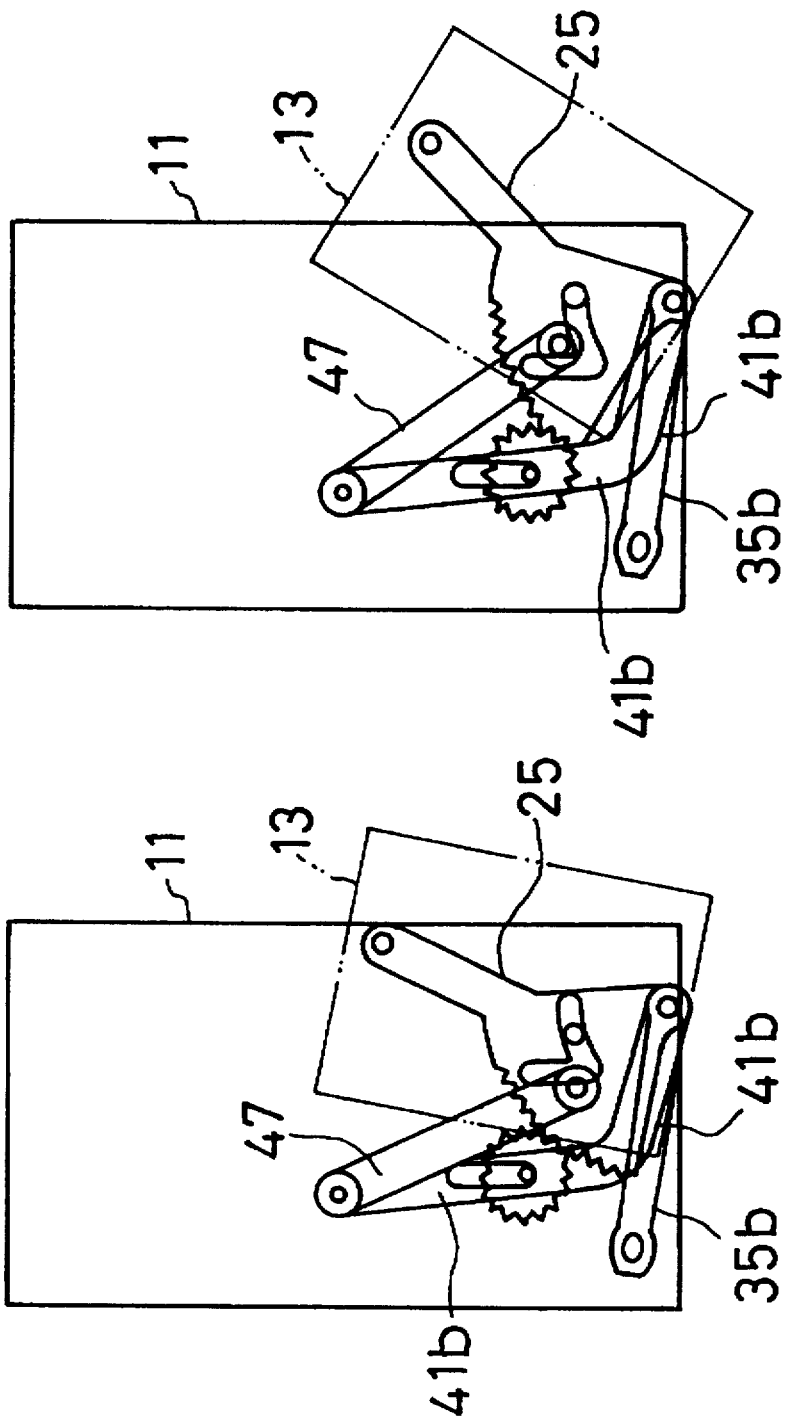

APPARATUS PROVIDED WITH A MOVABLE CARTRIDGE CASING

BACKGROUND OF THE INVENTION

1. Field of the Invention

The present invention relates to an apparatus provided with a movable cartridge casing having a cartridge receiving chamber and capable of being moved to the outside of the body structure of the apparatus to facilitate loading a film cartridge into and removing the film cartridge from the apparatus.

2. Description of the Related Art

A film strip contained in an unused conventional film cartridge has a leading end section, i.e., a film leader, extending outside the shell of the film cartridge. A camera that uses this type of a film cartridge requires a rather troublesome film loading operation to open the back door of the camera, to load the film cartridge into the cartridge chamber and to bring the film leader into engagement with a take-up reel.

A camera designed to facilitate the film loading operation proposed in, for example, U.S. Pat. No. 4,841,319 uses a drop-in film cartridge containing a film strip having a film leader not extending outside the shell of the film cartridge. This known camera rotates the film spool of the drop-in film cartridge automatically in a film feed direction to feed the film strip after the drop-in film cartridge has been dropped into the cartridge chamber of a cartridge casing and the cartridge casing has been pushed back into the camera body. The aforesaid camera that uses the drop-in film cartridge is provided with a movable cartridge casing capable of being moved outside the camera body to facilitate operations for loading a drop-in film cartridge into and unloading the same from the camera.

Incidentally, it is desirable, for positioning the film strip in a high accuracy in the camera body, to feed the film strip from the film cartridge with the spool of the film cartridge supported at its opposite ends to position the spool accurately. In view of such a purpose, it is desirable that the camera is provided with a drive shaft and a support shaft disposed so as to engage the opposite ends, respectively, of the spool of the film cartridge to support the spool in place when the cartridge casing containing a film cartridge is set at a film feeding position, i.e., a position within the camera body, after the film cartridge has been loaded into the camera by moving the cartridge casing to a cartridge receiving position, i.e., a position outside the camera body, inserting the film cartridge into the cartridge casing and returning the cartridge casing to the film feeding position.

In such a camera in which the spool is supported at its opposite ends with the drive shaft and the support shaft while the spool is driven for rotation by the drive shaft, the cartridge casing must be moved away from either the drive shaft or the support shaft, or at least either the drive shaft or the support shaft must be retracted from the operating position to avoid interference between the spool and either the drive shaft or the support shaft and, at the meantime, the spool must securely be supported at its opposite ends by the drive shaft and the support shaft during a film feeding operation.

A spool driving mechanism proposed in Japanese Patent Laid-open No. Hei 1-319737 includes a spool driving fork disposed in a cartridge casing, spool driving mechanisms proposed in Japanese Patent Laid-open Nos. Hei 4-80734 and Hei 4-80735 include a spool driving fork which is moved away from a cartridge casing when the cartridge casing is moved.

In these previously proposed spool driving mechanisms, it is difficult to position the spool driving fork in a high accuracy relative to the spool because the fork is moved relative to the camera body. Furthermore, there is the possibility that an interlocking mechanism for interlocking a fork driving gear for driving the spool driving fork is unable to function smoothly to interlock the fork driving gear and the film feed mechanism and to disconnect the fork driving gear from the film feed mechanism.

SUMMARY OF THE INVENTION

Accordingly, it is a principal object of the present invention to provide an apparatus provided with an improved movable cartridge casing capable of facilitating operations for loading a film cartridge into the apparatus and for unloading the film cartridge from the apparatus.

Another object of the present invention is to provide an apparatus provided with an improved movable cartridge casing capable of being moved in a resultant direction resulting from a combination of a first direction substantially parallel to a spool driving shaft and a second direction different from the first direction to prevent interference between the film spool of a film cartridge inserted in the cartridge casing and the spool driving shaft of an apparatus when loading the film cartridge into and unloading the same from the apparatus.

The above and other objects will become more apparent from the following description taken in connection with the accompanying drawings.

DETAILED DESCRIPTION OF THE PREFERRED EMBODIMENTS

First Embodiment

Figure 1:
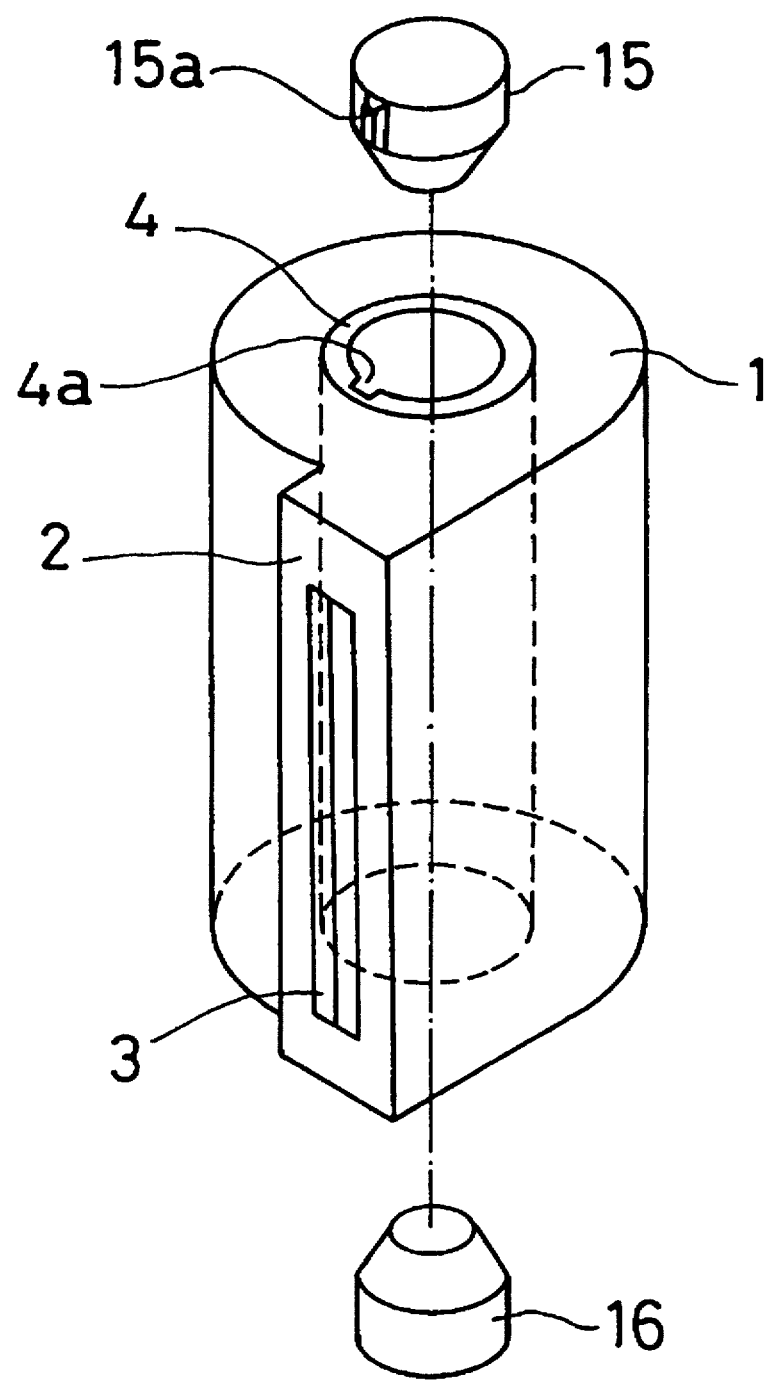
FIG. 1 is a perspective view of a drop-in film cartridge.

Referring to FIG. 1 showing, in a perspective view, a drop-in film cartridge to be used in combination with cameras in a first and a second embodiment according to the present invention, the film cartridge has a cartridge shell 1 having a film outlet portion 2 provided in its middle portion with a slit 3 lined with a soft, textile light trapping material, such as plush, to prevent ambient light from entering the cartridge shell 1 through the slit 3, and a film spool 4 supported for rotation within the cartridge shell 1. Indicated at 15 is a spool driving shaft mounted on the camera body 11 (FIG. 2) of a camera to drive the film spool 4 for rotation and provided with a protrusion 15a that engages a groove 4a formed in the inner surface of the upper end of the film spool 4, and at 16 is a support shaft mounted on the camera body 11 of the camera to support the film spool 4 at the lower end thereof. When an unused film is loaded in the camera, the leader of a film strip wound on the spool 4 is contained within the cartridge shell 1. When the film spool 4 is rotated in a film feeding direction after loading the film cartridge into the camera body 11, the film strip is fed through the slit 3. The cartridge shell 1 consists of two shell halves formed by molding a synthetic resin or the like. The two shell halves are joined together to form the cartridge shell 1 after putting the film spool 4 holding the film strip in a cavity defined by the two shell halves.

Figure 2:
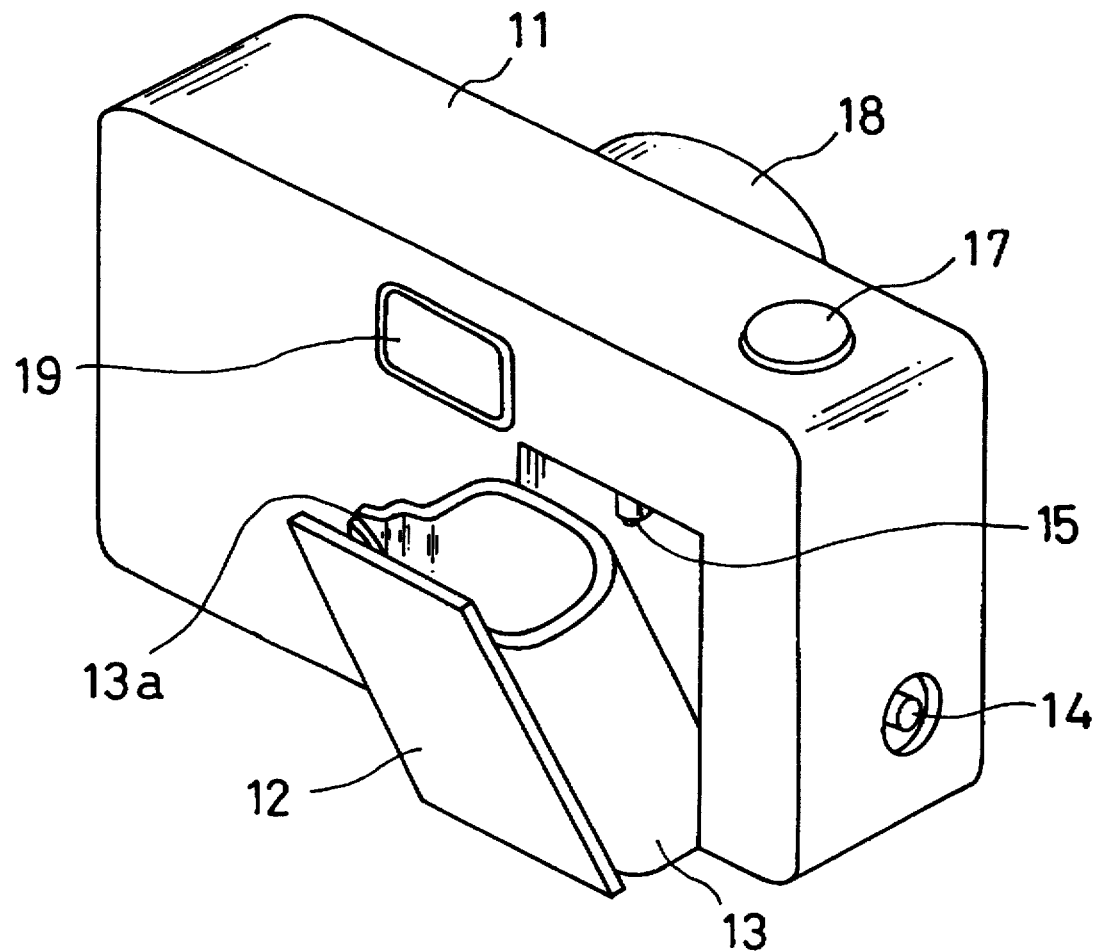
FIG. 2 is a perspective view of a camera in a first embodiment according to the present invention.

Referring to FIG. 2 showing, in a perspective view, a camera in the first embodiment according to the present invention, there are shown the camera body 11, a lid 12 for closing a cartridge chamber, a cartridge casing 13 attached to the inner surface of the lid 12 and having a film outlet slit 13a having a V-shaped cross section, an eject button 14 for moving the cartridge casing 13 from its film feeding position to its cartridge receiving position, the spool driving shaft 15 mounted on the camera body 11 to support and drive the spool 4, a shutter release button 17, a lens unit 18, and a viewfinder 19. The cartridge casing 13 is formed in a shape substantially conforming to the external form of the film cartridge, and has an open upper end and a height lower than the axial length of the film cartridge to facilitate inserting the film cartridge into and taking out the same from the cartridge casing 13. The support shaft 16 for supporting the film spool 4 of the film cartridge is mounted for rotation on the bottom wall, not shown, of the camera body 11.

Figure 3:
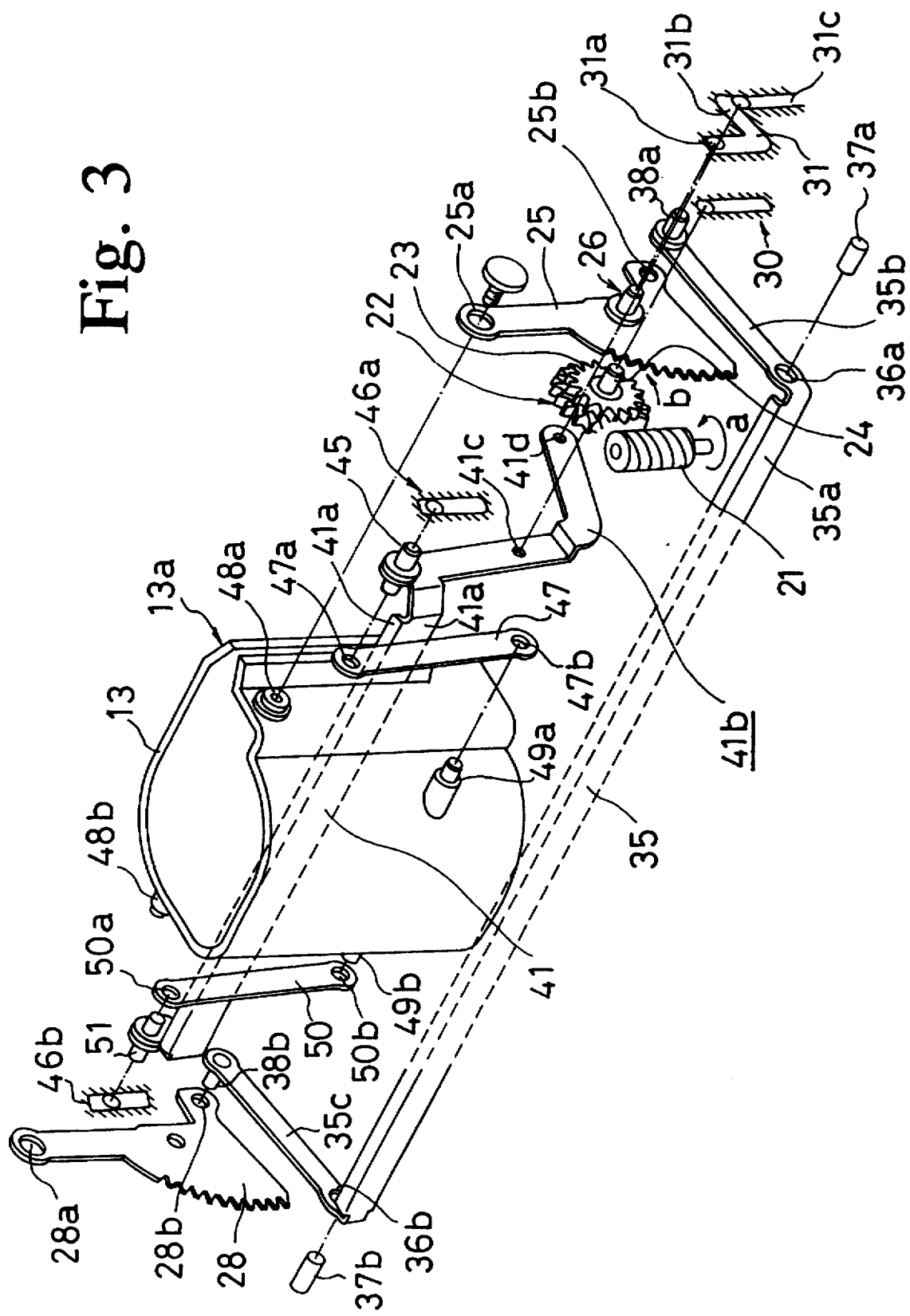
FIG. 3 is an exploded perspective view of a cartridge casing moving mechanism included in the camera of FIG. 2.

Referring to FIG. 3 showing, in an exploded perspective view, a cartridge casing moving mechanism included in the camera in the first embodiment, a worm 21 is mounted on the output shaft of a motor, not shown, a worm gear 22 is fixedly mounted on a shaft 24 so as to be in engagement with the worm 21, and a gear 23 fixedly mounted on the shaft 24 so as to be in engagement with a sector gear 25. The cartridge casing 13 is provided with trunnions 48a and 48b projecting from the upper portions of the outer surfaces of the opposite side walls thereof, respectively. The trunnions 48a and 48b are fitted for rotation in a hole 25a formed in an arm of the sector gear 25 and a hole 28a formed in an arm of the sector gear 28, respectively. Pins 49a and 49b projecting from the outer surface of the cartridge casing 13 are fitted in a hole 47b formed in a link plate 47 and a hole 50b formed in a link plate 50, respectively, to support the cartridge casing 13 for swing motion. The link plates 47 and 50 are joined pivotally to a lever 41, which will be described below.

The lever 41 consists of a straight portion 41a, an arm portion 41b having a shape substantially resembling the letter L and extending at right angles from one end of the straight portion 41a, and guide pins 45 and 51 attached to the opposite ends of the straight portion 41a and fitted for vertical sliding movement in guide slots 46a and 46b formed in the camera body 11, respectively. A hole 47a formed in the upper end of the link plate 47 and a hole 50a formed in the upper end of the link plate 50 receive the guide pins 45 and 51 so as to be supported for swing motion on the guide pins 45 and 51, respectively. The pins 49a and 49b of the cartridge casing 13 are supported pivotally in the hole 47b formed in the lower end of the link plate 47 and the hole 50b formed in the lower end of the link plate 50, respectively, so that the cartridge casing 13 is able to swing on the link plates 47 and 50.

The shaft 24 supporting the worm gear 22 and the gear 23 has one end rotatably fitted in a hole 41c formed in the bend of the L-shaped arm portion 41b of the lever 41 and the other end fitted for sliding movement in a guide slot 30 formed in the camera body 11. A lever 35 has a straight portion 35a and two arm portions 35b and 35c extending from the opposite ends, respectively, of the straight portion 35a perpendicularly to the straight portion 35a. Guide pins 37a and 37b provided on the camera body 11 are fitted in slots 36a and 36b formed in the arm portions 35b and 35c at positions near the junctions of the arm portions 35b and 35c and the opposite ends of the straight portion 35a, respectively. A pivot 38a projecting from the free end of the arm portion 35b of the lever 35 is rotatably fitted in a hole 25b formed in another arm of the sector gear 25 and a hole 41d formed in the free end of the L-shaped arm portion 41b. The pivot 38a is slidably fitted in a guide slot 31 formed in the camera body 11. The arm portion 35c of the lever 35, similarly to the arm portion 35b, is provided with a pivot 38b at its free end. The pivot 38b is rotatably fitted in a hole 28b formed in another arm of the sector gear 28, which is identical in shape with the sector gear 25, and slidably fitted in a guide slot, not shown, corresponding to the guide slot 31. The sector gear 28 is not in engagement with any gear and functions as a lever. Therefore, the sector gear 28 may be substituted by any suitable lever other than a sector gear.

The movement of the cartridge casing 13 from the film feeding position to the cartridge receiving position to unload the film cartridge from the camera will be described with reference to FIGS. 3 to 7.

Figure 4:
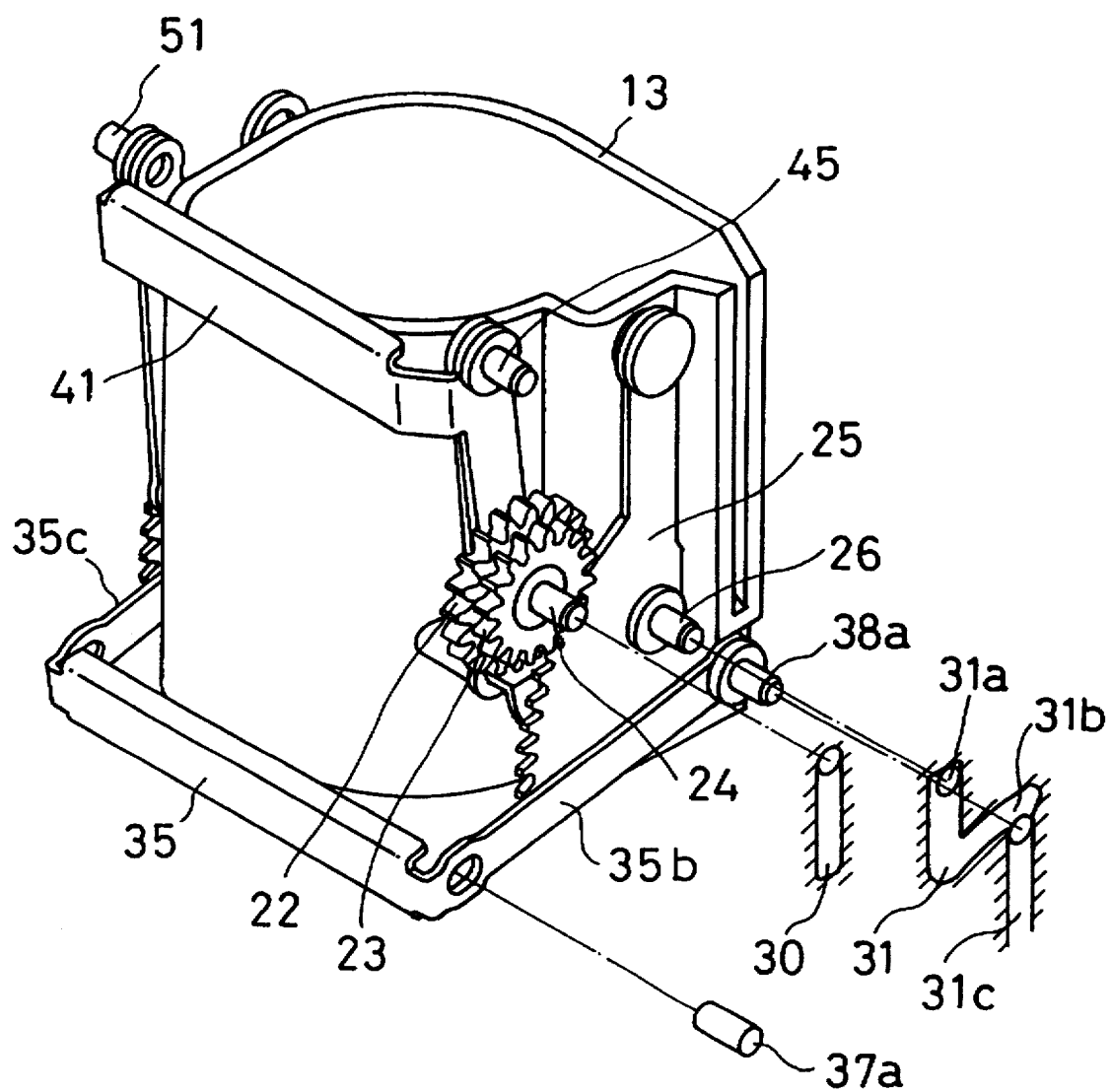
FIG. 4 is a perspective view of the cartridge casing moving mechanism of FIG. 3 in a state where a cartridge casing is positioned at its film feeding position.
Figure 5:
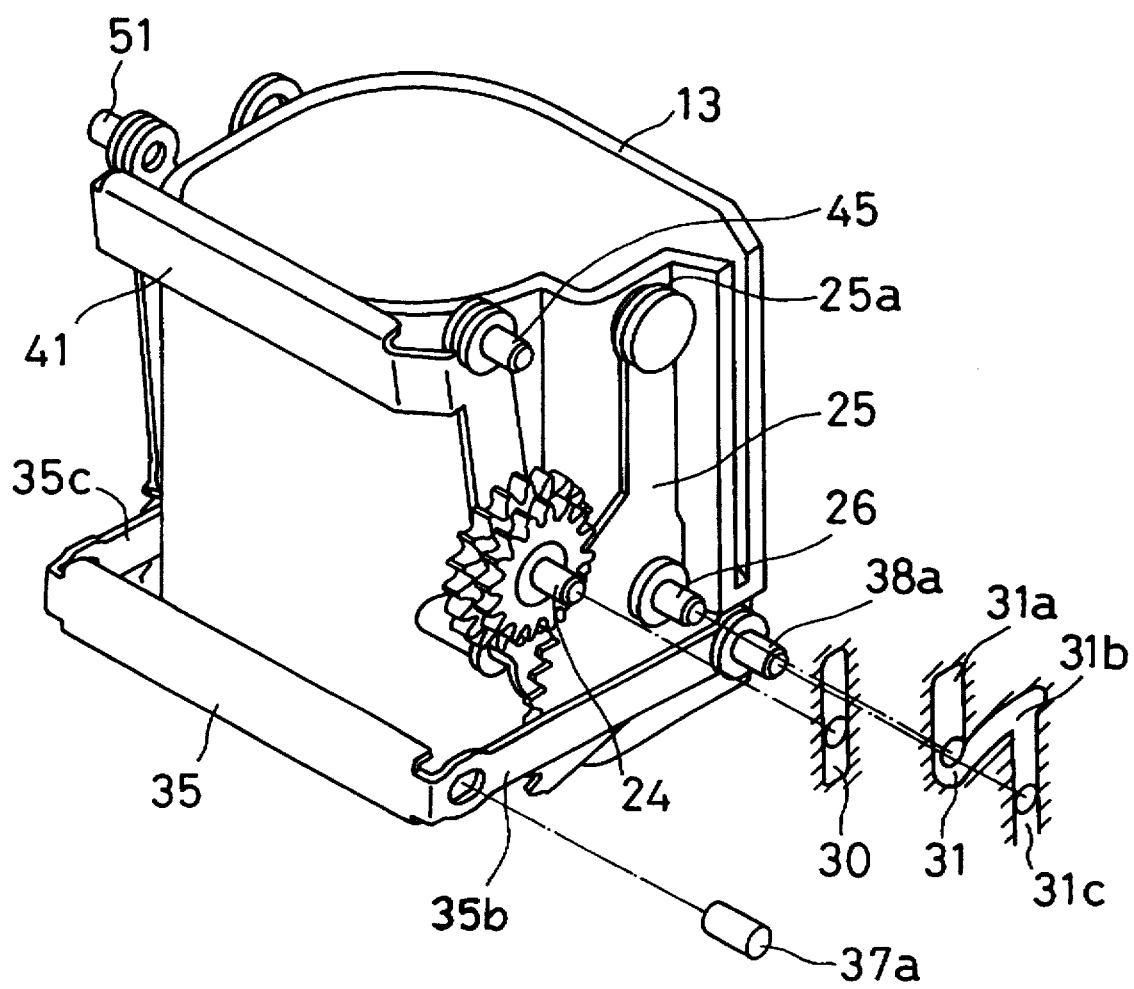
FIG. 5 is a perspective view of the cartridge casing moving mechanism of FIG. 3 in a state where the cartridge casing is on the way from its film feeding position to its cartridge receiving position.
Figure 6:
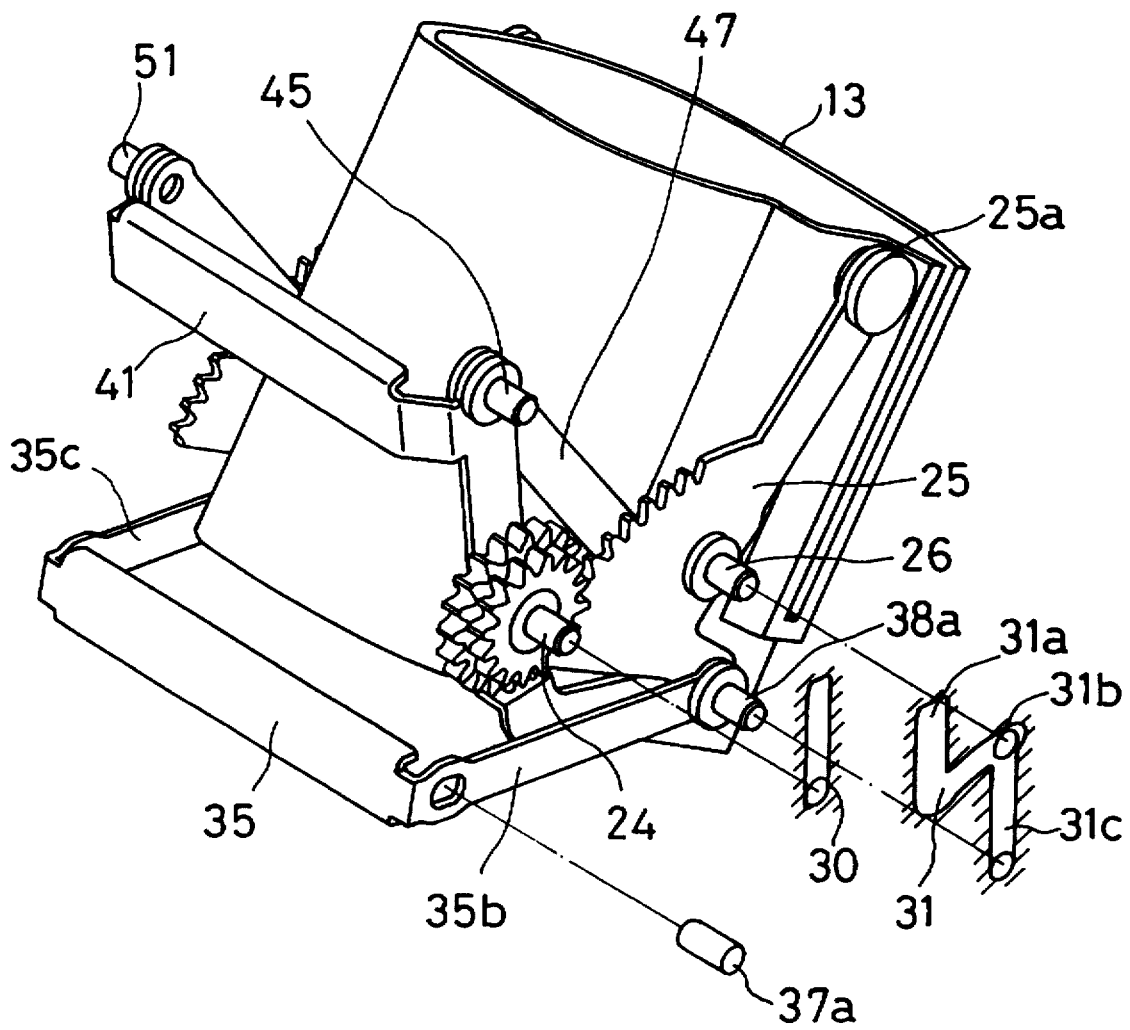
FIG. 6 is a perspective view of the cartridge casing moving mechanism of FIG. 3 in a state where the cartridge casing is positioned at its cartridge receiving position.
Figure 7:
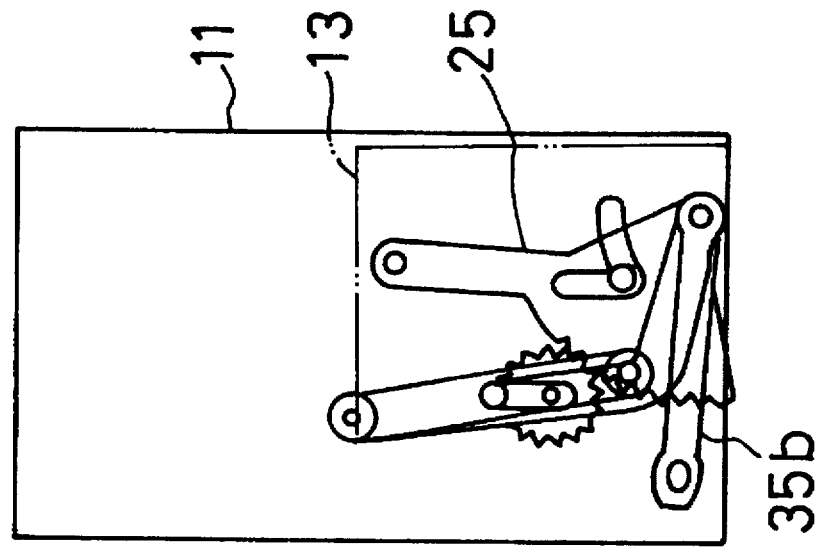
FIGS. 7(a), 7(b), 7(c) and 7(d) are schematic side views of assistance in explaining the operation of the cartridge casing moving mechanism of FIG. 3 for moving the cartridge casing.
Figure 7:
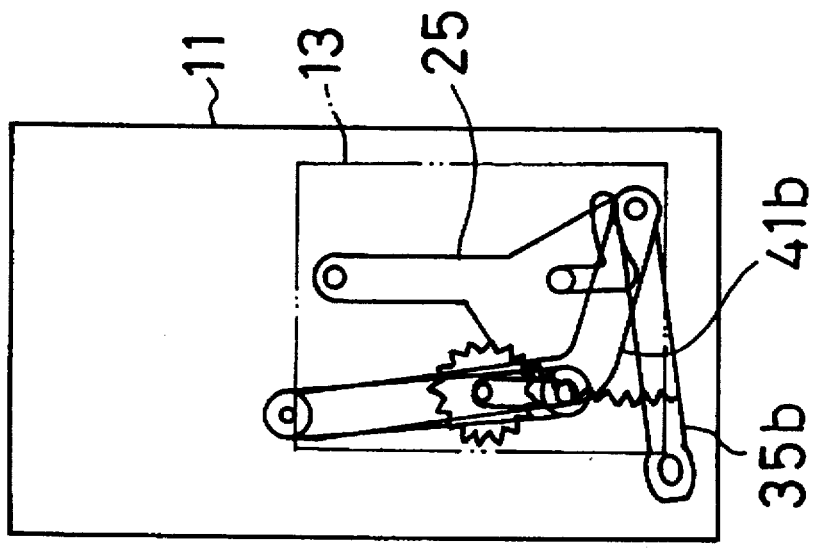

When moving the cartridge casing 13 from the film feeding position to the film receiving position, the eject button 14 (FIG. 2) is pushed to actuate a motor, not shown, to rotate the worm 21 in the direction indicated by the arrow a, in an attempt to rotate the worm gear 22 in engagement with the worm 21 in the direction indicated by the arrow b together with the gear 23 in engagement with the sector gear 25 to turn the sector gear 25. However, since a pin 26 projecting from the side surface of the sector gear 25 is fitted in a guide slot 31 formed in the camera body 11 and positioned at one end of a vertical section 31a of the guide slot 31, the sector gear 25 is unable to turn. Consequently, the gear 23 rolls downward on the teeth of the sector gear 25 (FIG. 4). At the same time, the shaft 24 supporting the gear 23 moves along the guide slot 30 of the camera body 11, the pin 26 of the sector gear 25 moves downward along the vertical section 31a of the guide slot 31 of the camera body 11, and the pivot 38a projecting from the free end of the arm portion 35b of the lever 35 moves downward along the lower vertical section 31c of the guide slot 31 of the camera body 11 (FIGS. 4 and 5). Then, the guide pin 45 moves downward along the guide slot 46a, and the shaft 24 fitted in the hole 41d of the L-shaped arm portion 41b of the lever 41 moves downward along the guide slot 30, the cartridge casing 13 supported on the lever 41 by the link plates 47 and 50 moves downward (FIG. 5), the film cartridge contained in the cartridge casing 13 moves downward together with the cartridge casing 13 and, consequently, the spool 4 of the film cartridge is separated from the spool driving shaft 16 provided on the upper wall of the camera body 11. Upon the arrival of the shaft 24 supporting the gear 23 at the bottom of the guide slot 30, the pin 26 of the sector gear 25 travels through the vertical section 31a into the circular section 31b of the guide slot 31 because the shaft 24 stays at the bottom of the guide slot 30 and the gear 23 continues to rotate and, consequently, the sector gear 25 turns clockwise, namely, tilts to the right in FIG. 3 (FIG. 6), whereby the cartridge casing 13 having the trunnions 48a and 48b pivotally fitted in the hole 25a of the arm of the sector gear 25 and the hole 28a of the arm of the sector gear 28 is tilted to the right in FIG. 3 to the cartridge receiving position outside the camera body 11 (FIG. 6).

The movement of the cartridge casing 13 from the cartridge receiving position to the film feeding position to load a film cartridge into the camera will be described hereinafter.

The eject button 14 (FIG. 2) is pushed to actuate the motor, not shown, to rotate the worm 21 in a direction reverse to the direction indicated by the arrow a. Then, the worm gear 22 is rotated together with the gear 23 in a direction reverse to the direction indicated by the arrow b, so that the sector gear 25 is turned counterclockwise, namely, is turned to the left in FIG. 3. Consequently, the cartridge casing 13 having the trunnions pivotally fitted in the hole 25a of the arm of the sector gear 25 and the hole 28a of the arm of the sector gear 28 is turned into the camera body 11 (FIG. 5). As the gear 23 continues to rotate, the pin 26 of the sector gear 25 travels through the circular section 31b of the guide slot 31 formed in the camera body 11, and then moves upward along the vertical section 31a of the guide slot 31. Consequently, the guide pin 45 of the lever 41 moves along the guide slot 46a, the shaft 24 supporting the substantially L-shaped arm portion 41b of the lever 41 moves upward along the guide slot 30, and the cartridge casing 13 containing a film cartridge and supported on the lever 41 by the link plates 47 and 50 is moved upward to the film feeding position. Consequently, the film spool 4 is brought into engagement with the spool driving shaft 16 (FIG. 4).

FIGS. 7(a) to 7(d) show the cartridge casing moving mechanism in different stages of cartridge casing moving operation. The cartridge casing moving mechanism is in a state where the cartridge casing 13 is positioned at the film feeding position in FIG. 7(a), in a state where the cartridge casing 13 has been moved to a lower position and the upper end of the film spool 4 is separated from the spool driving shaft 16 in FIG. 7(b), in a state immediately after the cartridge casing 13 has started to tilt outward in FIG. 7(c), and in a state where the cartridge casing 13 has been tilted to the cartridge receiving position in FIG. 7(d).

In the camera in the first embodiment according to the present invention, the cartridge casing positioned at the film feeding position within the camera body is moved down first, and then tilted to the cartridge receiving position outside the camera body, and the cartridge casing is turned first from the cartridge receiving position to a position where the cartridge casing is coaxial with the axis of the spool driving shaft, and then the cartridge casing is raised to the film feeding position.

Second Embodiment

Figure 8:
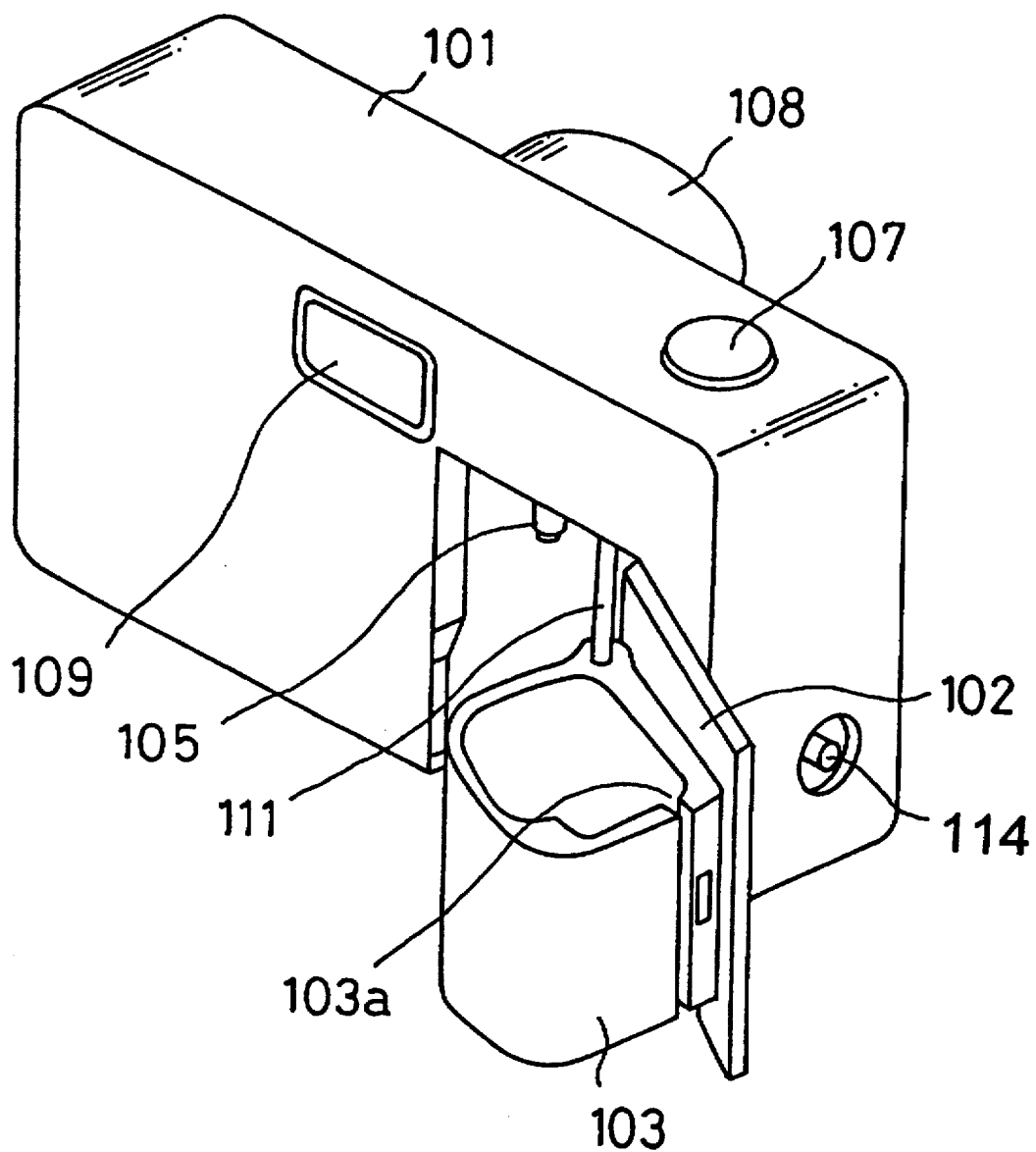
FIG. 8 is a perspective view of a camera in a second embodiment according to the present invention.

A camera in a second embodiment according to the present invention will be described hereinafter. Referring to FIG. 8 showing the camera in the second embodiment in a perspective view, the camera has a camera body 101 supporting a cartridge casing 103 having a film outlet slit 103a having a V-shaped cross section. The cartridge casing 103 is supported by a guide rod 111 so as to slide vertically along the guide rod 111 and to be turned on the guide rod 111 between a film feeding position and a cartridge receiving position. In FIG. 8, the cartridge casing 103 is at the cartridge receiving position. Shown also in FIG. 8 are an eject button 114 to be operated in moving the cartridge casing 103 to the cartridge receiving position, a spool driving shaft 105 provided on the camera body 101 to drive the film spool 4, a shutter release button 107, a lens unit 108, a view finder 109, and a lid 102 for closing a cartridge compartment in which the cartridge casing 103 is disposed. The cartridge casing 103 has a shape substantially conforming the external form of the film cartridge, an open upper end, and a height smaller than that of the film cartridge to facilitate operations for inserting the film cartridge into and taking out the same from the cartridge casing 103. A support shaft, not shown, is supported for rotation on the bottom wall of the camera body 101 to support the film spool 4 of the film cartridge contained in the cartridge casing 103.

Figure 9:
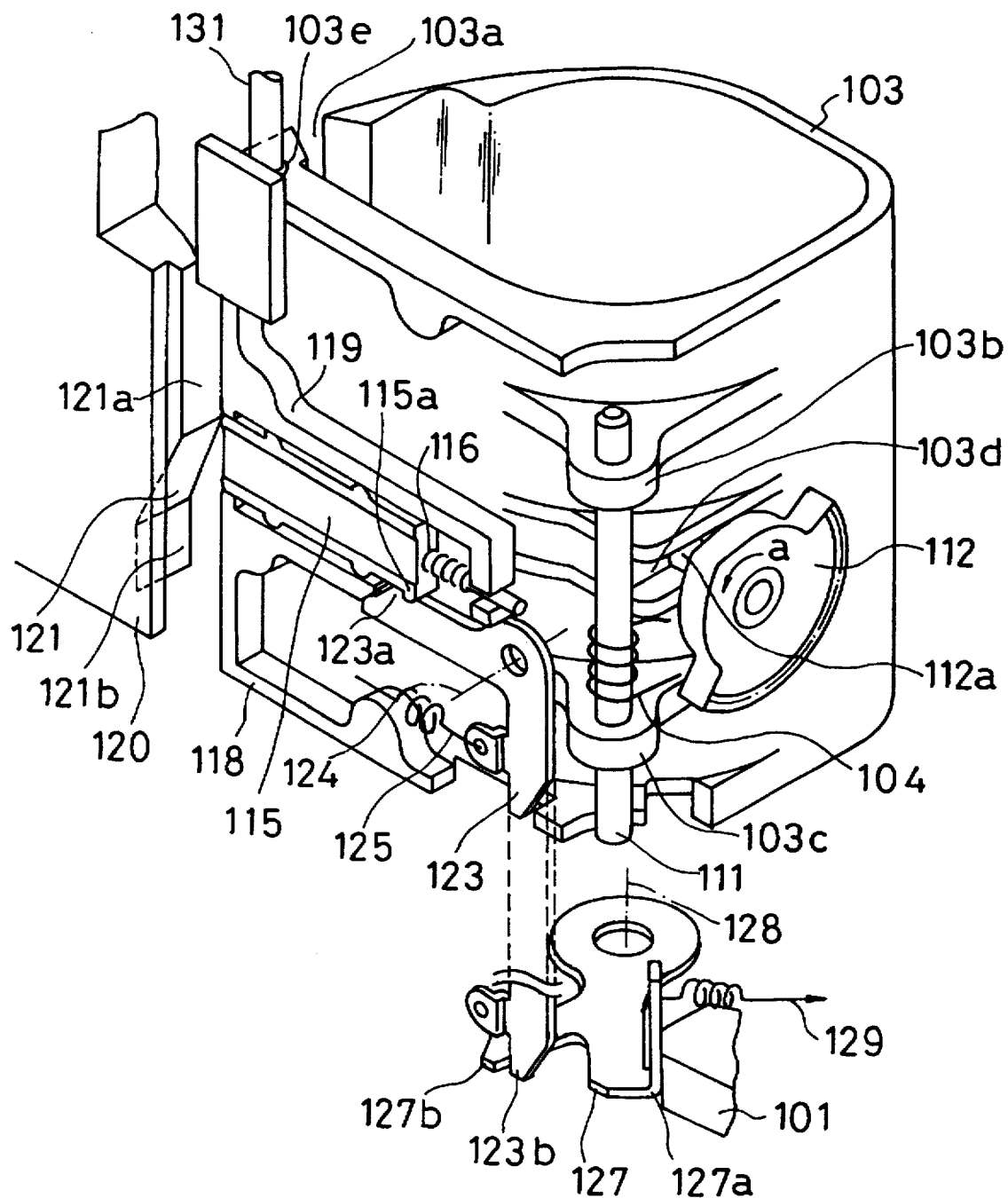
FIG. 9 is a perspective view of a cartridge casing moving mechanism included in the camera of FIG. 8.
Figure 10:
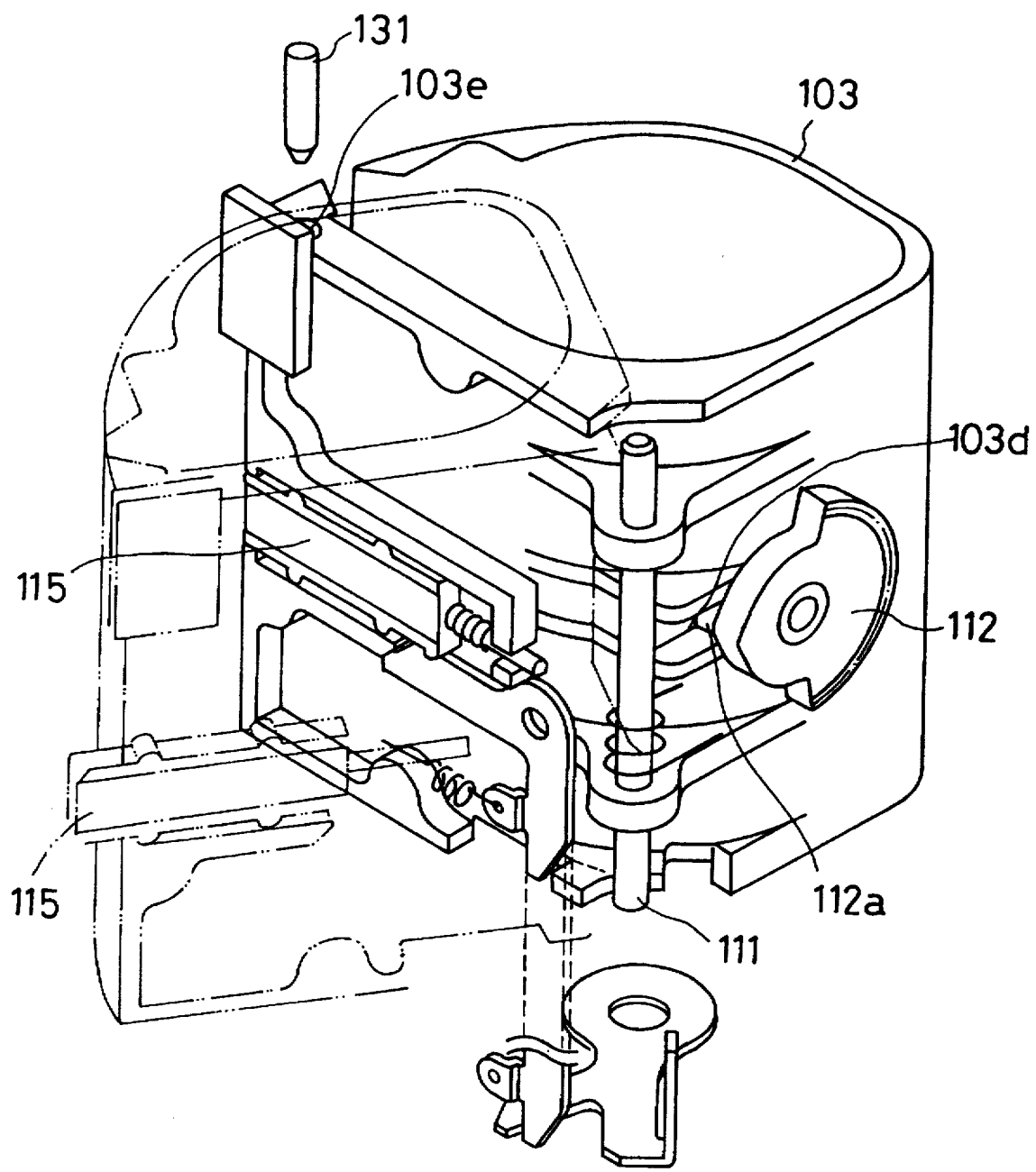
FIG. 10 is a perspective view of a cartridge casing included in the camera of FIG. 8 and moved to a cartridge receiving position by the cartridge casing moving mechanism of FIG. 9.

Referring to FIG. 9 showing a cartridge casing moving mechanism included in the camera in the second embodiment according to the present invention, in which the cartridge casing 103 is positioned at the film feeding position, the cartridge casing 103 is provided on its outer surface with lugs 103b and 103c, the guide rod 111 is extended through holes formed in the lugs 103b and 103c to support the cartridge casing 103 for vertical movement along the guide rod 111 and turning on the guide rod 111, and the cartridge casing 103 is biased counterclockwise, namely, toward the cartridge receiving position, with a spring 104. A cam groove 103d is formed in the outer surface of the cartridge casing 103. A pin 112a projecting from the side surface of a sector gear 112, which is driven for rotation through a gear mechanism, not shown, by a motor, not shown, in parallel to the axis of rotation of the sector gear 112 is in engagement with the cam groove 103d. When the sector gear 112 is turned in the direction indicated by the arrow a, the pin 112a turns along a circle about the axis of rotation of the sector gear 112 to force the cartridge casing 103 to move downward. When the sector gear 112 is turned in a direction reverse to the direction indicated by the arrow a, the pin 112a turns to force the cartridge casing 103 to move upward. FIG. 10 shows a state where the sector gear 112 has been turned counterclockwise through a fixed angle and the cartridge casing 103 has been moved to its lower position.

A locking slider 115 is supported for sliding movement between support members 118 and 119 attached to the outer surface of the cartridge casing 103 and is biased to the left in FIG. 9 by a spring 116. The extremity, i.e., the left end, of the locking slider 115 is caught by a catching part 120 of the camera body 101 so that the locking slider 115 locks the cartridge casing 103 at the film feeding position. A cam 121 having a high section 121a and a low section 121b is formed near the catching portion 120 on the inner surface of the camera body 101. When the cartridge casing 103 is positioned correctly at the film feeding position, the left end of the locking slider 115 is on the high section 121a of the cam 121 and hence the locking slider 115 is pressed to the right in FIG. 9. The locking slider 115 is stopped and locked at this position shown in FIG. 9, which will be described later. When the cartridge casing 103 is moved to the lower position, the left end of the locking slider 115 is in contact with the low section 121b of the cam 121 to enable the locking slider 115 to be caught by the catching part 120.

A substantially L-shaped holding lever 123 is supported pivotally for turning about an axis 124 on the outer surface of the cartridge casing 103 and is biased clockwise in FIG. 9 with a spring 125. When the cartridge casing 103 is positioned at the film feeding position, a hook 123a formed at the extremity of one arm of the holding lever 123 is in engagement with a protrusion 115a formed on the lower surface of the locking slider 115 to retain the locking slider 115 at a position shown in FIG. 9 against the biasing force of the spring 116. A release lever 127 is supported for turning about an axis 128 on the outer surface of the cartridge casing 103. The release lever 127 is biased counterclockwise by a spring 129 so that a first end 127a thereof rests on the camera body 101. A second end 127b of the release lever 127 is in engagement with the free end 123b of one arm of the holding lever 123. When the cartridge casing 103 is turned from the film feeding position by the resilience of the spring 104, the second end 127b of the release lever 127 pulls the free end of the holding lever 123 against the resilience of the spring 125 to disengage the hook 123a of the holding lever 123 from the protrusion 115a of the locking slider 115, so that the locking slider 115 is released and is moved to the left in FIG. 9 by the spring 116. When the cartridge casing 103 is positioned at the film feeding position, a locking pin 131 supported on the camera body 101 is inserted in a hole 103e formed in the upper end of the cartridge casing 103 to prevent the cartridge casing 103 from turning. When lowered along the guide rod 111, the cartridge casing 103 is released from the locking pin 131 and is allowed to turn on the guide rod 111.

An operation for loading a film cartridge into the camera will be described hereinafter with reference to FIGS. 8, 9 and 10. When moving the cartridge casing 103 from the film feeding position to the cartridge receiving position, the eject button (FIG. 8) is pushed to actuate the motor, not shown. Then, the sector gear 112 is turned in the direction indicated by the arrow a and the pin 112a fitted in the cam groove 103d moves downward to lower the cartridge casing 103 downward along the guide rod 111. The cartridge casing 103 is unable to turn until the locking pin 131 comes out of the hole 103e formed in the upper end of the cartridge casing 103. In this state, the second end 127b of the release lever 127 and the free end 123a of the holding lever are engaged, the hook 123a of the holding lever 123 and the protrusion 115a of the locking slider 115 are engaged and hence the locking slider 115 does not move. Therefore, even when the cartridge casing 103 is lowered to position the locking slider 115 opposite to the lower section 121b of the cam 121 provided on the inner surface of the camera body 101, the locking slider 115 is unable to be moved to the left in FIG. 9. When the cartridge casing 103 is lowered further, the pin 131 comes out of the hole 103e formed in the upper end of the cartridge casing 103 and, consequently, the cartridge casing 103 is turned counterclockwise on the guide rod 111 by the resilience of the spring 104. Since the release lever 127 is biased counterclockwise by the spring 129 so that the first end 127a thereof rests on the camera body 101, the cartridge casing 103 turns about the axis 128 relative to the release lever 127. Consequently, the free end 123b of the holding lever 123 is pulled by the second end 127b of the release lever 127 against the resilience of the spring 125 to turn the holding lever 123 counterclockwise about the axis 124. Consequently, the hook 123a of the holding lever 123 is separated from the protrusion 115a of the locking slider 115 and the locking slider 115 is released. Then, the locking slider 115 is moved to the left in FIG. 9 by the resilience of the spring 115a. Since the cartridge casing 103 has been turned counterclockwise before the locking slider 115 is released, the locking slider 115 is not caught by the catching part 120 of the camera body 101. The cartridge casing 103 is turned counterclockwise on the guide rod 111 to the cartridge receiving position indicated by alternate long and two short dashes lines in FIG. 10.

A film cartridge is inserted in the cartridge casing 103 positioned at the cartridge receiving position, and then the cartridge casing 103 is turned clockwise against the resilience of the spring 104 from the cartridge receiving position to the film feeding position. When the cartridge casing 103 is turned clockwise toward the film feeding position, the extremity of the locking slider 115 collides against the catching part 120 of the camera body 101, is pushed to the right in FIG. 9, rides over the catching part 120, and then is moved to the left by the spring 116 to a position behind the catching part 120 so as to be caught by the catching part 120, so that the cartridge casing 103 is unable to be turned counterclockwise by the spring 104. In this state, the first end 127a of the release lever 127 is in contact with the camera body 101, and the second end 127b of the release lever 127 is in engagement with the free end 123b of the holding lever 123. Then, upon the detection of arrival of the cartridge casing 103 at a predetermined position within the camera body 101, the motor is actuated to turn the sector gear 112 in a direction reverse to the direction indicated by the arrow a. Then, the pin 112a engaging the cam groove 103d pushes the cartridge casing 103 so as to move upward along the guide rod 111. As the cartridge casing 103 is moved upward, the extremity of the locking slider 115 moves from the low section 121b to the high section 121a and is pushed to the right in FIG. 9. Consequently, the second end 127b of the release lever 127 and the free end 123b of the holding lever are engaged, and the hook 123a of the holding lever 123 and the protrusion 115a of the locking slider 115 are engaged. Since the hook 123a of the holding lever 123 and the protrusion 115a of the locking slider 115 are engaged again to hold the locking slider 115 at the locking position, the locking slider 115 does not restrain the cartridge casing 103 from turning toward the cartridge receiving position. However, the cartridge casing 103 is unable to turn toward the film receiving position and is held at the film feeding position because the pin 131 is received in the hole 103e formed in the upper end of the cartridge casing 103.

As is apparent from the foregoing description, in the first and the second embodiment of the present invention, when moving the cartridge casing from the film feeding position to the cartridge receiving position, first the cartridge casing is moved to a position where the film spool of the film cartridge contained in the cartridge casing is separated from the spool driving shaft, and then the cartridge casing is moved to the cartridge receiving position and, when moving the cartridge casing from the cartridge receiving position to the film feeding position, first the cartridge casing is moved to the position where the film spool is separated from the spool driving shaft, and then the cartridge casing is moved to the film feeding position where the film spool is in engagement with the spool driving shaft. Accordingly, the allowance for fit between the spool driving shaft and the film spool may be very small, to fit the spool driving shaft closely in the film spool, so that the film spool can be rotated smoothly in feeding the film and in taking up the film. Since the cartridge casing is moved to the cartridge receiving position after disengaging the film spool of the film cartridge from the spool driving shaft, the camera need not be provided with any mechanism for retracting the spool driving shaft from the film spool, so that the spool driving mechanism can be formed in a compact construction. Since the film cartridge is inserted in the cartridge casing positioned at the cartridge receiving position outside the camera body, the film cartridge can readily be inserted into the cartridge casing without holding the camera in a particular position, which facilitates the film cartridge loading operation.

Third Embodiment

Figure 11:
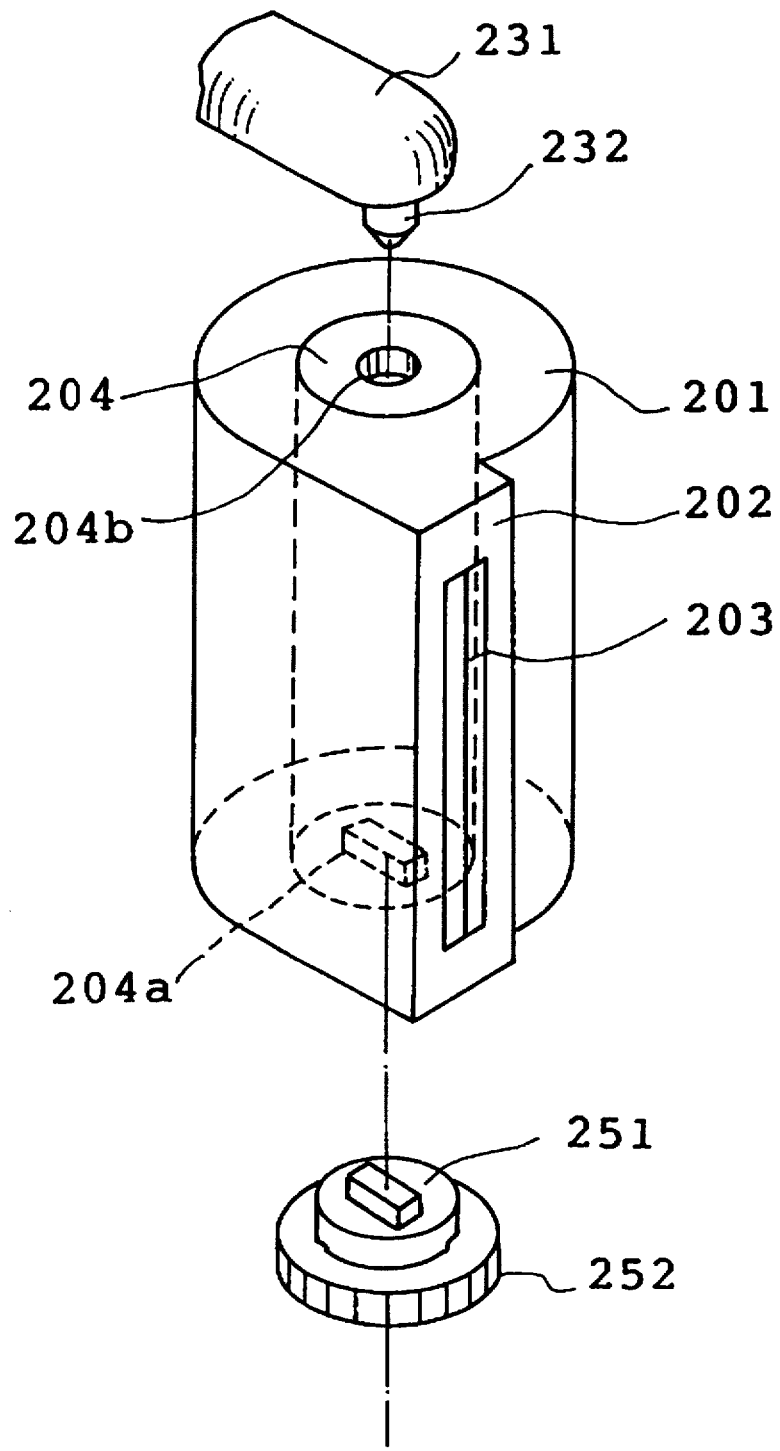
FIG. 11 is a perspective view of a drop-in film cartridge to be used in combination with a camera in a third embodiment according to the present invention.

First a drop-in film cartridge to be used in combination with a camera in a third embodiment according to the present invention will be described with reference to FIG. 11. The film cartridge comprises a cartridge shell 201 and a film spool 204. The cartridge shell 201 has a film outlet portion 202 provided with a slit 203 lined with a soft, textile light trapping material, such as plush, to prevent light from entering the cartridge shell 201 when a film strip is sent out through the slit 203. The film spool 204 has one end provided with a recess 204a to receive a spline 251 formed in a spool driving gear 252 provided in the camera body, and the other end provided with a hole 204b to receive a support shaft 232 attached to the extremity of a cartridge casing moving lever 231 provided in the camera body. When the unused film cartridge is loaded into the camera, the leader of a film strip wound on the film spool 204 is contained within the cartridge shell 201. When the film spool 204 is rotated in a film feeding direction after loading the film cartridge 201 into the camera body 211 (FIG. 12) of the camera, the film strip is sent out through the slit 203.

Figure 12:
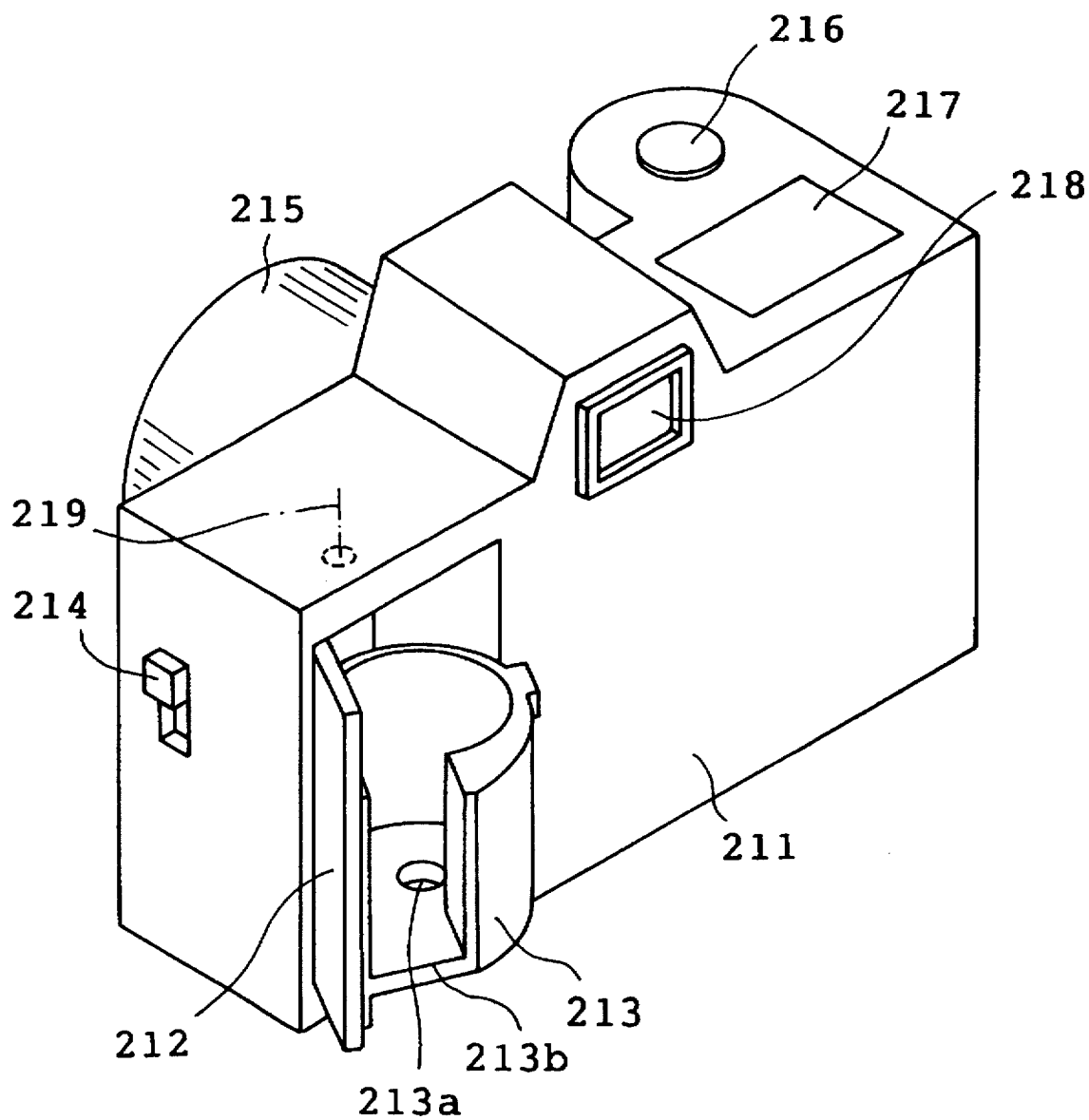
FIG. 12 is a perspective view of the camera in the third embodiment according to the present invention.

Referring to FIG. 12 showing the camera in the third embodiment according to the present invention in a perspective view, in which a cartridge casing 213 is positioned at a cartridge receiving position outside the camera body 211, a back lid 212 for covering a cartridge compartment formed in the camera body 211 is supported for turning on a shaft 219 provided within the camera body 211, and the cartridge casing 213 is mounted on the back lid 212 so as to be slidable relative to the back lid 212. The cartridge casing 213 can be turned together with the back lid 212 between the cartridge receiving position outside the camera body 211 and a film feeding position within the camera body 211. When the cartridge casing 213 is positioned at the film feeding position, the back lid 212 is flush with the outer surface of the back cover of the camera to form part of the back cover. Shown also in FIG. 12 are a back lid releasing lever 214, a lens unit 215, a shutter release button 216, a liquid crystal display panel 217 and a viewfinder 218.

The cartridge casing 213 has a bottom wall provided with a through hole 213a through which the spline 251 projects into the cartridge chamber of the cartridge casing 213 to engage the film spool 204 of the film cartridge 201, which will be described later. The cartridge casing 213 has a cross section substantially corresponding to that of the film cartridge 201 and is provided with an elongate opening 213b to receive the film outlet portion 202 of the film cartridge 201 fitly therein. The cartridge casing 213 has an open upper end and a height smaller than that of the film cartridge 201 to facilitate operations for inserting the film cartridge 201 into and taking out the film cartridge 201 from the cartridge casing 213.

Figure 13:
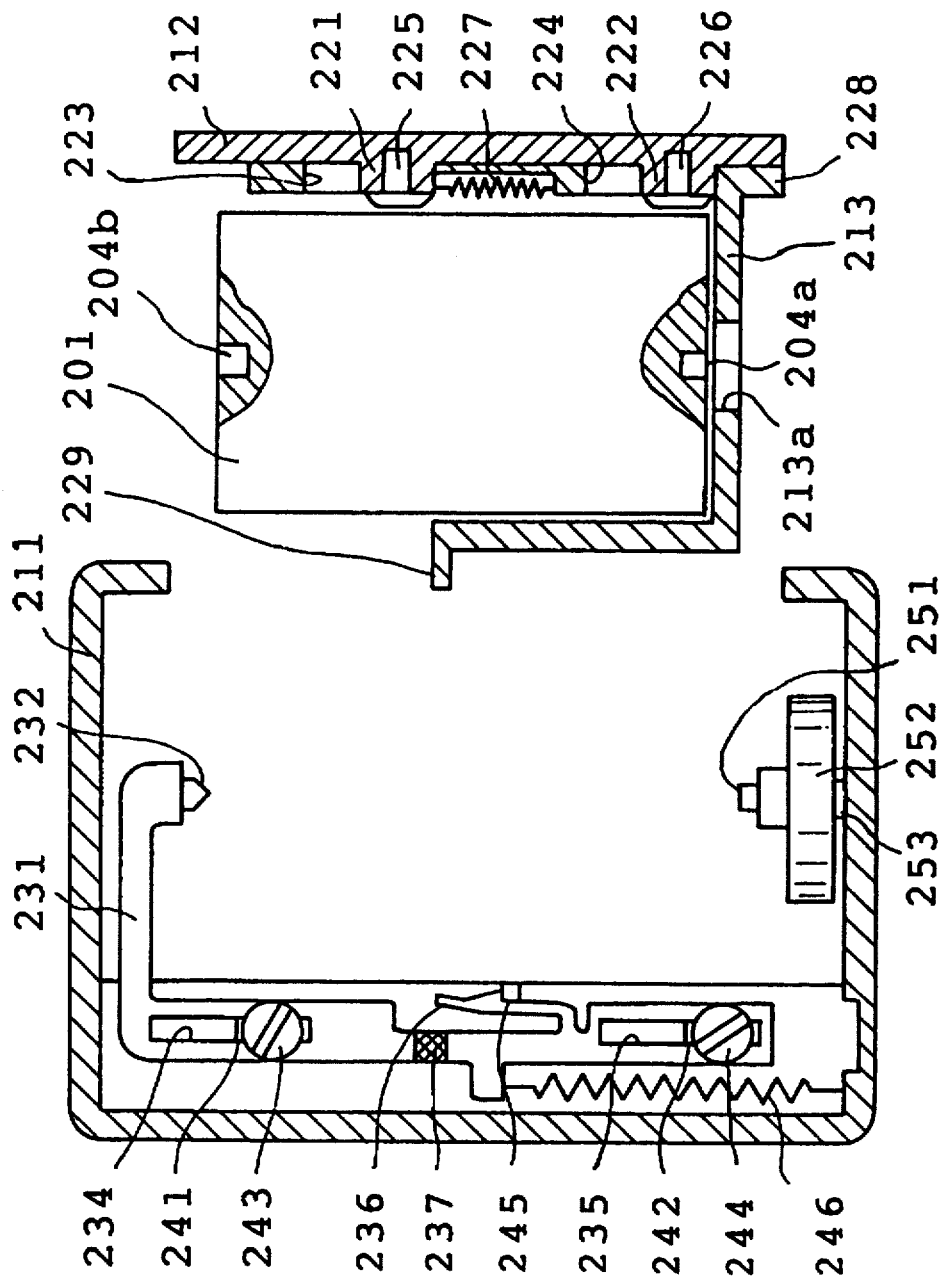
FIG. 13 is a longitudinal sectional view of assistance in explaining the movement of a cartridge casing included in the camera of FIG. 12, in which the cartridge casing is positioned at its cartridge receiving position.
Figure 14:
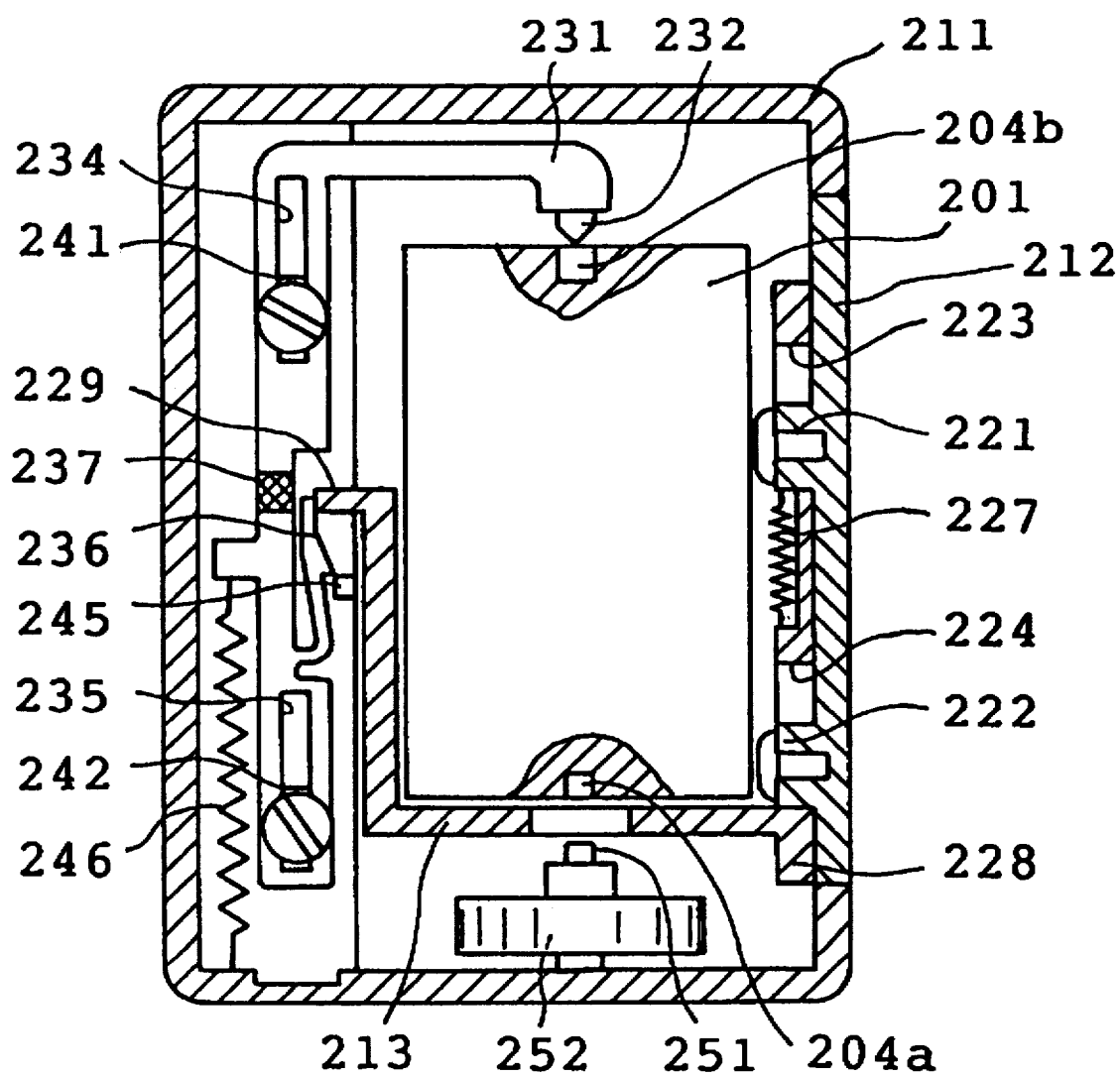
FIG. 14 is a longitudinal sectional view taken on the axis of a spool driving fork shaft included in the camera of FIG. 12, of assistance in explaining the movement of the cartridge casing of FIG. 13, in which the cartridge casing is positioned in the camera but it is not in the film feeding position.
Figure 15:
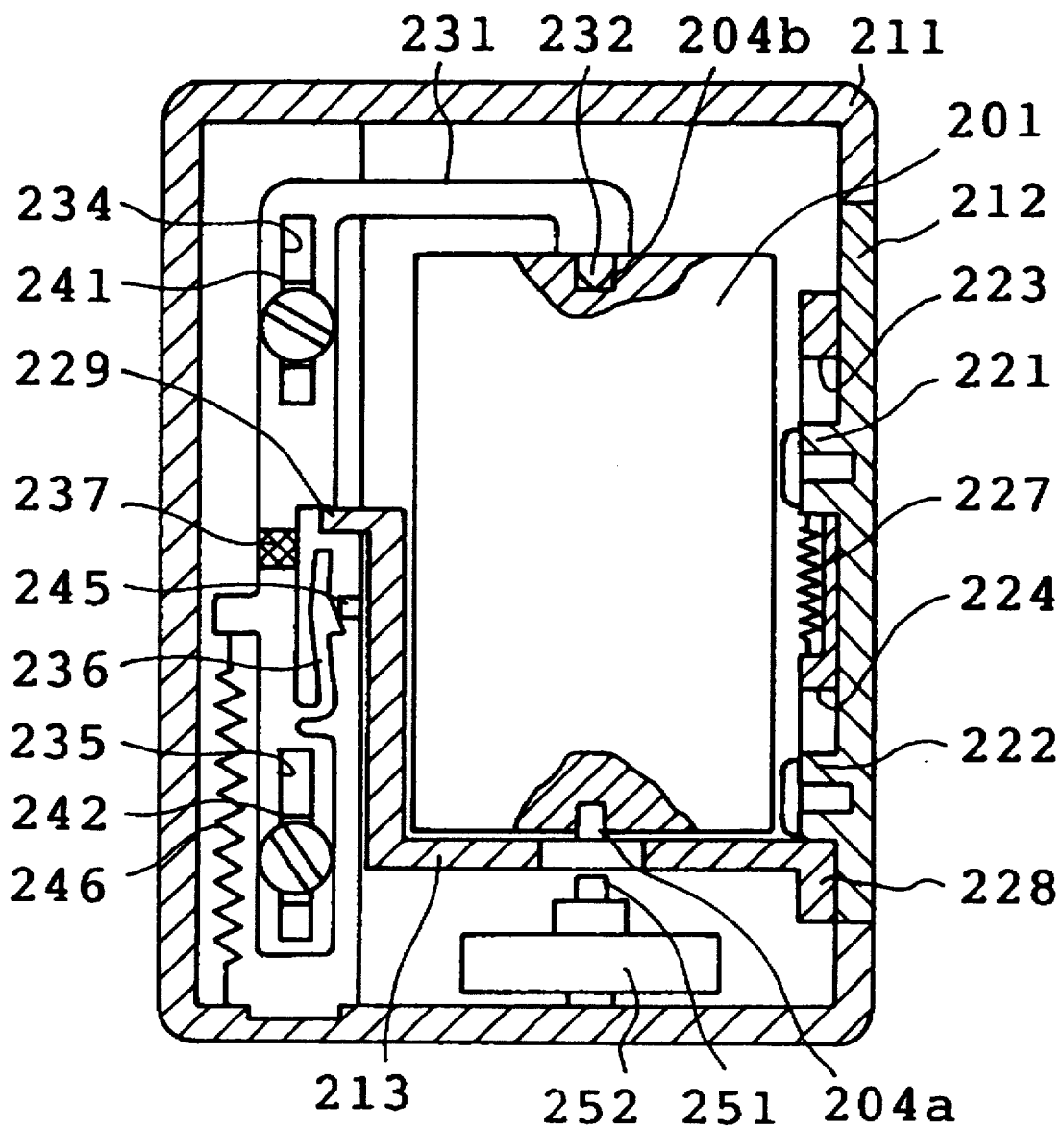
FIG. 15 is a longitudinal sectional view taken on the axis of the spool driving fork shaft, showing a state where a film cartridge inserted into the cartridge casing is in the initial stage of being pushed downward.
Figure 16:
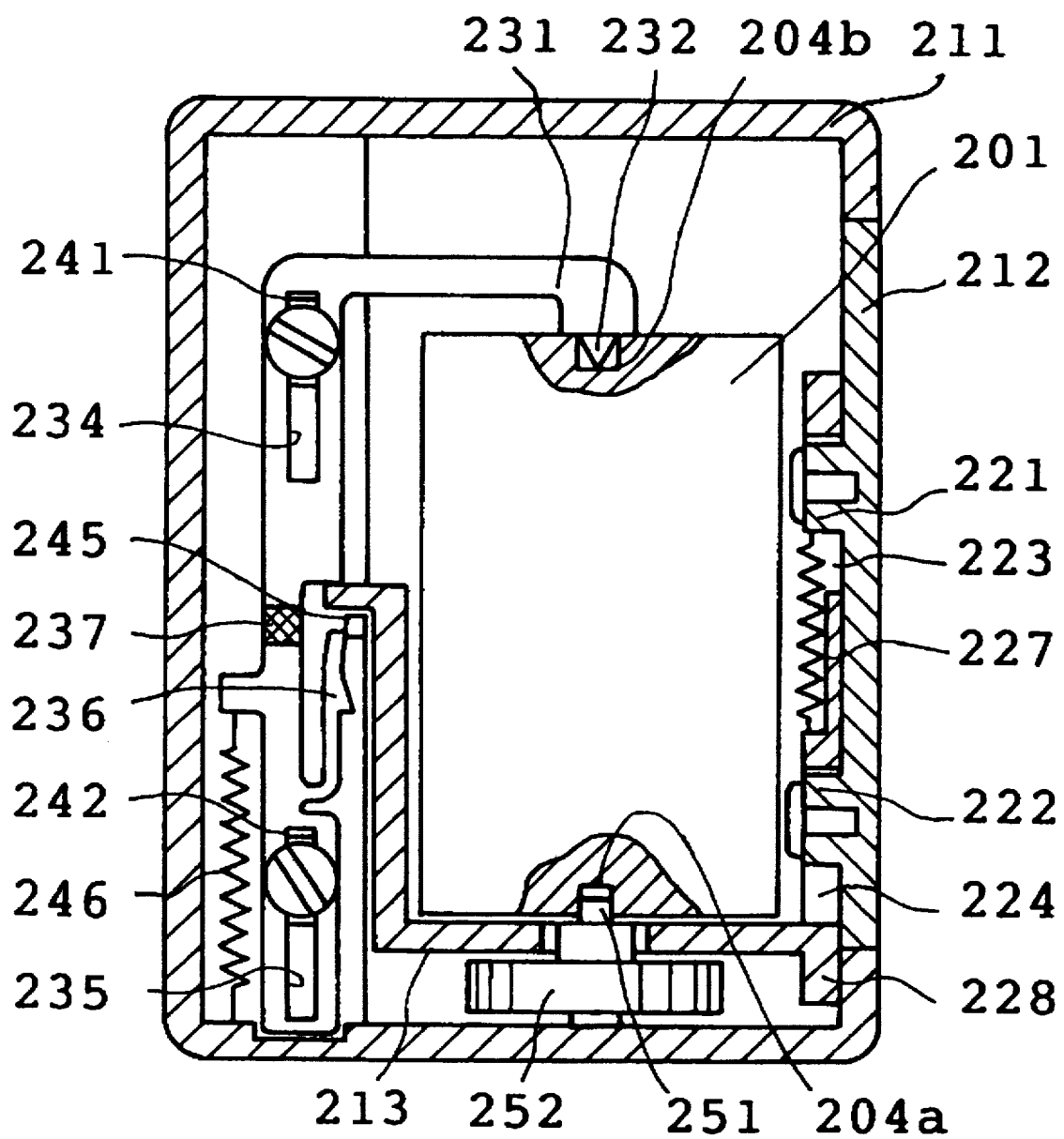
FIG. 16 is a longitudinal sectional view similar to FIG. 15, showing a state where the film cartridge has been pushed down to a film feeding position.

FIGS. 13 to 16 are longitudinal sectional views of the camera body 211 taken on the center axis of the spool driving gear 252, in which the cartridge casing 213 is positioned at the cartridge receiving position outside the camera body 211 in FIG. 13, the cartridge casing 213 is pushed into the cartridge compartment within the camera body 211 in FIG. 14, the cartridge casing 213 is being pushed downward together with the film cartridge 201 in FIG. 15, and the cartridge casing 213 has been moved together with the cartridge casing 213 to its lowermost position, i.e., the film feeding position in FIG. 16.

Referring to FIG. 13, slots 223 and 224 are formed in the back side wall of the cartridge casing 213 facing the back lid 212, guide protrusions 221 and 222 are arranged on the back lid 212 so as to be received in the slots 223 and 224 of the cartridge casing 213 to guide the cartridge casing 213 for vertical sliding movement. The front side wall of the cartridge casing 213 facing the inner wall of the camera body 211 is provided with a projection 229, which is brought into contact with a flexible hook 236 formed integrally with the cartridge casing moving lever 231. Pins 225 and 226 are attached to the guide protrusions 221 and 222 to keep the guide protrusions 221 and 222 in engagement respectively with the slots 223 and 224, a spring 227 is extended between the back lid 212 and the cartridge casing 213, and the bottom wall of the cartridge casing 213 is provided with a projection 228 for locking the cartridge casing 213 at the film feeding position. Thus, the cartridge casing 213 is supported on the back lid 212 so as to be slidable in vertical directions relative to the back lid 212 and is biased upward by the spring 227 relative to the back lid 212. In the state shown in FIG. 13, the cartridge casing 213 is held at its uppermost position relative to the back lid 212 and the camera body 211.

The cartridge casing moving lever 231 having a shape substantially resembling the inverted letter L has a horizontal arm section integrally provided at its extremity with the support shaft 232 to be fitted in the hole 204b formed in one end of the film spool 201 of the film cartridge 201, a vertical stem section provided with two slots 234 and 235, the elastic hook 236 at its middle portion, and a projection 237 that engages a back lid releasing lever 214 (FIG. 12) for releasing the back lid 212. The camera body 211 is provided internally with guide protrusions 241 and 242 received respectively in the guide slots 234 and 235 of the cartridge casing moving lever 231 to guide the cartridge casing moving lever 231 for vertical sliding. Pins 243 and 244 are attached to the guide protrusions 241 and 242, respectively, to prevent the cartridge casing moving lever 231 from separating from the guide protrusions 241 and 242. The elastic hook 236 engages a projection 245 projecting from the inner wall of the cartridge casing 213 to retain the cartridge casing moving lever 231 at the uppermost position. A spring 246 is extended between the camera body 211 and the cartridge casing moving lever 231 to bias the cartridge casing moving lever 231 downward. The spool driving gear 252 provided with the spline 251 is supported for rotation on a shaft 253 set upright on the bottom wall of the camera body 211. The spool driving gear 252 is engaged with a film feeding mechanism, not shown, for driving the spool driving gear 252 to feed the film strip and to take up the film strip.

A film cartridge loading operation will be described hereinafter. Suppose that the cartridge casing 213 is positioned at the cartridge receiving position outside the camera body 211 as shown in FIG. 13. In this state, the cartridge casing 213 is held at the uppermost position relative to the back lid 212 and the camera body 211 by the spring 227, and the cartridge casing moving lever 231 is held at its uppermost position with the elastic hook 236 in engagement with the projection 245. Therefore, when the cartridge casing 213 containing the film cartridge 201 is pushed into the camera body 211, the cartridge casing moving lever 231 and the spline 251 of the spool driving gear 252 will not interfere with the film cartridge 201 and the cartridge casing 213.

The cartridge casing 213 containing the film cartridge 210 is pushed into the camera body 211 in a state shown in FIG. 14. In this state, the cartridge casing 213 is positioned at the uppermost position, and the elastic hook 236 is pushed to the left in FIG. 14 by the projection 229 of the cartridge casing 213 to disengage the elastic hook 236 from the projection 245. Consequently, the cartridge casing moving lever 231 is moved downward by the resilience of the spring 246 and the support shaft 232 of the cartridge casing moving lever 231 is fitted in the hole 204b of the film spool 204 of the film cartridge 201 as shown in FIG. 15. The cartridge casing moving lever 231 is moved further downward by the resilience of the spring 246 after the support shaft 232 thereof has been fitted in the hole 204b of the film spool 204 to move the cartridge casing 213 downward together with the film cartridge 201. Then, the spline 251 of the spool driving gear 252 projects through the through hole 213a of the bottom wall of the cartridge casing 213 into the recess 204a formed in the lower end of the film spool 204 of the film cartridge 201, and the projection 228 of the cartridge casing 213 engages the inner surface of the camera body 211 to lock the cartridge casing at the film feeding position when the cartridge casing 213 is moved down to the film deeding position as shown in FIG. 16. In this state, the film strip can be fed or taken up.

When moving the cartridge casing 213 from the film feeding position shown in FIG. 16 to the cartridge receiving position shown in FIG. 13, the back lid releasing lever 214 provided outside the camera body 211 is operated to raise the projection 237 in engagement with the back lid releasing lever 214, so that the cartridge casing moving lever 231 is raised against the resilience of the spring 246 via the position shown in FIG. 15. As the cartridge casing moving lever 231 is raised beyond the position shown in FIG. 15, the support shaft 232 is separated from the hole 204b of the spool 2 to enable the spring 227 to raise the cartridge casing 213 containing the film cartridge 201 and, consequently, the film spool 204 of the film cartridge 201 is released from the spline 251 as shown in FIG. 14. The elastic hook 236 pushes the cartridge casing 213 at the projection 229 and the cartridge casing 213 is turned on the shaft 219 to the cartridge receiving position. Then, the elastic hook 236 engages the projection 245 to retain the cartridge casing moving lever 231 at the uppermost position. The cartridge casing moving lever 231 may be moved vertically by an electrical means including a motor instead of moving the same by the manual operation of the back lid releasing lever 214 and the resilience of the spring 246.

As is apparent from the foregoing description, in the camera in the third embodiment according to the present invention, the cartridge casing can be moved to the cartridge receiving position without being obstructed by the spline of the spool driving gear provided in the camera body because the cartridge casing is moved axially away from the spline before turning the cartridge casing toward the cartridge receiving position, and the film spool and the spline can securely be engaged because the cartridge casing is moved axially toward the spline to position the cartridge casing at the film feeding position. Since the spool driving gear provided with the spline, and the spool driving gear driving mechanism need not be moved relative to the camera body, the spool driving gear provided with the spline can be positioned in a high accuracy and can surely be engaged with the spool driving gear driving mechanism. Thus, the camera is provided with the film feeding mechanism capable of accurately positioning the film strip in the camera body.

What is claimed is:

1. An apparatus having a body provided with a movable cartridge casing capable of being moved between a cartridge receiving position, where a film cartridge is inserted into or taken out from said cartridge casing, outside the body and a film feeding position inside the body, said apparatus comprising:

a spool driving shaft provided in the body and capable of engaging the film spool of a film cartridge contained in said cartridge casing to drive the film spool for rotation when said cartridge casing is positioned at the film feeding position;

a first cartridge casing moving mechanism which moves said cartridge casing between the film feeding position and an intermediate position, where the film spool is separated from said spool driving shaft, along a line parallel to a first direction; and a second cartridge casing moving mechanism which moves said cartridge casing between the intermediate position and the cartridge receiving position in a second direction different from the first direction.

2. An apparatus according to claim 1, wherein said second cartridge casing moving mechanism supports said cartridge casing for turning relative to the body.

3. An apparatus according to claim 2, wherein said second cartridge casing moving mechanism turns said cartridge casing about an axis substantially parallel to the bottom surface of the body.

4. An apparatus according to claim 2, wherein said second cartridge casing moving mechanism turns said cartridge casing about an axis substantially parallel to the axis of said spool driving shaft.

5. An apparatus according to claim 1, wherein said cartridge casing has a film cartridge inlet through which the film cartridge is inserted end-ways into said cartridge casing.

6. An apparatus according to claim 1 further comprising a spool support shaft that supports the film spool of the film cartridge at one end thereof opposite to the other end thereof in engagement with said spool driving shaft.

7. An apparatus according to claim 6, wherein said spool support shaft is disposed on the side of the bottom surface of said cartridge casing opposite to said film cartridge inlet.

8. An apparatus according to claim 6, wherein said spool support shaft engages the film spool of the film cartridge contained in said cartridge casing when said cartridge casing is moved to the intermediate position.

9. An apparatus according to claim 8, wherein said cartridge casing is moved in a direction substantially parallel to the axis of said spool driving shaft by the resilience of a spring acting in a direction substantially parallel to the axis of said spool driving shaft to bring the film spool into engagement with said spool driving shaft after the film spool and said spool support shaft have been engaged.

10. An apparatus according to claim 1, wherein said apparatus is a camera.

11. An apparatus according to claim 10, wherein said second cartridge casing moving mechanism moves said cartridge casing to the cartridge receiving position behind said camera.

12. An apparatus having a body provided with a movable cartridge casing capable of being moved between a cartridge receiving position, where a film cartridge is inserted into or taken out from said cartridge casing, outside the body and a film feeding position inside the body, said apparatus comprising:

a spool driving shaft provided in the body and capable of engaging the film spool of a film cartridge contained in said cartridge casing to drive the film spool for rotation when said cartridge casing is positioned at the film feeding position; and a cartridge casing driving mechanism which is capable of moving said cartridge casing between the film feeding position and an intermediate position where the film spool is separated from said spool driving shaft along a line substantially parallel to the axis of said spool driving shaft and of turning said cartridge casing relative to the body between the intermediate position and the cartridge receiving position.

13. An apparatus having a body provided with a movable cartridge casing capable of being moved between a cartridge receiving position, where a film cartridge is inserted into or taken out from said cartridge casing, outside the body and a film feeding position inside the body, said apparatus comprising:

a spool driving shaft provided in the body and capable of engaging the film spool of a film cartridge contained in said cartridge casing to drive the film spool for rotation when said cartridge casing is positioned at the film feeding position; and a cartridge casing driving mechanism which is capable of carrying out steps of moving said cartridge casing away from said spool driving shaft substantially in parallel to the axis of said spool driving shaft to an intermediate position, where the film spool is separated from said spool driving shaft, and moving said cartridge casing from the intermediate position to the cartridge receiving position when moving said cartridge casing from the film feeding position to the cartridge receiving position, and of carrying out steps of moving said cartridge casing from the cartridge receiving position to the intermediate position and moving said cartridge casing toward said spool driving shaft substantially in parallel to the axis of said spool driving shaft when moving said cartridge casing from the cartridge receiving position to the film feeding position.

* * * * *